Figure 1:
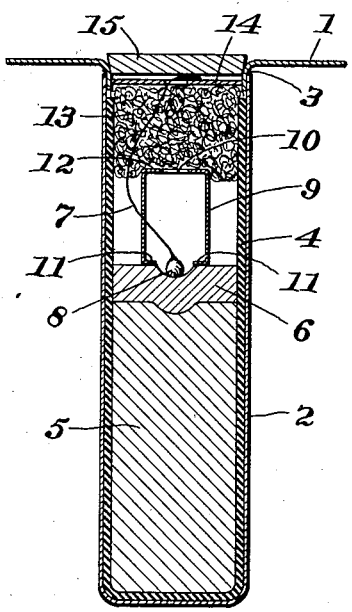

Oct. 9, 1945.    W. A. CALDWELL    2,386,654
CHEMICAL IMMERSION HEATER
Filed July 8, 1943

Inventor:
Walter Anderson Caldwell,
By G. M. Houghton
Attorneys.

Patented Oct. 9, 1945

2,386,654

UNITED STATES PATENT OFFICE 2,386,654

CHEMICAL IMMERSION HEATER

Walter Anderson Caldwell, West Kilbride, Scotland, assignor to Imperial Chemical Industries Limited, a corporation of Great Britain Application July 8, 1943, Serial No. 493,904
In Great Britain March 24, 1942

5 Claims. (Cl. 126—263)

The present invention relates to improvements in the manufacture of chemical immersion heaters for liquid and semiliquid materials, for instance foodstuffs, and in particular to chemical immersion heaters of the kind in which there is employed a heating composition comprising a mixture of solid ingredients adapted on ignition to react exothermically, yielding a molten slag as the principal product of their reaction. By the term "molten slag" as used herein is meant any molten residue of the reaction, irrespective of its chemical nature. The invention relates more particularly to means whereby the ejection of particles of molten slag through the vent provided for the filtered and cooled subsidiary gaseous products may be prevented.

In my copending application, Serial No. 426,234, filed January 9, 1942, there are described chemical immersion heaters in which the heating composition employed comprises a mixture of calcium silicide and red lead or iron oxide which leaves a molten slag comprising molten lead or molten iron as a principal product of the reaction when the composition is ignited. In my copending application, Serial No. 426,233, filed January 9, 1942, there are described food cans in which the wall of a chemical immersion heater forms an integral portion of the can, the heating composition employed comprising a mixture of oxidising and reducing agents that reacts to form a hot residue substantially without gaseous products, and this hot residue may likewise be a molten slag. The present invention is especially applicable to chemical immersion heaters forming or intended to form part of the structure of food cans.

Although the active ingredients in the heating compositions for chemical immersion heaters are chosen so that the reaction will be highly exothermic and the products of the reaction, whether solid or liquid, will be of a non-volatile nature, at least a small quantity of gaseous products is ordinarily evolved in practice, and unless a gas filter is provided the exothermic reaction is usually accompanied by such undesired manifestations at the gas escape vent as a dark metallic smoke, sparks of red hot material, and a flame. This flame is usually due to the ignition of hydrogen liberated in the exothermic reaction from small amounts of water present in the composition, especially when this contains a solid diluent of a hydrous nature, such as china clay, or of hydrogen generated when an internal heat insulating lining made from a hydrous material such as china clay or asbestos paper is provided for the wall of the immersion heater, as is frequently convenient. The emergence of red-hot particles, flame or smoke through the vent can however be prevented by the provision on top of the heating composition of a gas permeable plug made by pressing a loose heat-resisting material such as asbestos fibre, glass wool or the like, which serves to filter and cool the emerging gases. The employment of such a filter plug resting on the top of the heating composition is disclosed in the aforesaid specifications.

As will be readily understood it is desirable that the bulk of the immersion heater should be small in relation to that of material to be heated by it, and that the chemical heating composition should be packed closely so that the amount of it may be conveniently high in relation to the available volume. If the plug of loose heat-resisting material is too tightly pressed, the spaces available in the body of the plug may be so small, or the resistance it offers to penetration by the molten slag may be so great, that the expansion which takes place in the volume of the heating composition in the course of its transformation into molten slag cannot be taken up within the body of the plug, with the result that the plug may become filled with molten slag and fail to act as a filter, or with the result that molten slag may be forcibly ejected by the path of least resistance and thence through the gas vent. This might cause personal injury to the user, or cause the appearance of flame at the vent.

According to the present invention these inconveniences associated with the use of a gas permeable cooling filter consisting of a plug of pressed loose incombustible material are prevented by the provision of space sufficient for the expansion of the molten slag between the packed heating composition and the gas permeable plug of pressed loose incombustible material.

In putting the invention into effect, a spacer body, through which or past which the gases can stream, pressed against the top of the heating composition may conveniently be employed. When, as is usual, the heating composition is tightly packed in the immersion heater the expansion may represent a considerable fraction of its original volume, but the free space thereby necessitated may wholly or nearly be compensated for by a reduction in the quantity of loose material required for the plug, and by the greater extent to which it may be pressed.

It is the usual practice to press between the composition constituting the greater portion of the chemical heating composition and the plug a layer of a more easily ignited priming composition, which may or may not itself form a molten slag, but which leaves an intensely hot non-volatile residue. For the purposes of the present invention the term "heating composition" includes any such layer, and the invention is thus applicable to the cases when either the composition comprising the main portion of the chemical heating composition, or the priming composition, or both form a molten slag.

The invention is for instance applicable when the greater portion of the heating composition comprises a mixture of calcium silicide and red lead or iron oxide, diluted with a solid inert inorganic diluent such as china clay, and where the priming composition portion comprises a mixture of calcium silicide and red lead similarly diluted but to a smaller extent. In this case both portions form a liquid slag, but the invention may also be employed when the main portion of the heating composition has little tendency to flow, but the priming composition portion forms a liquid slag.

Figure 2:
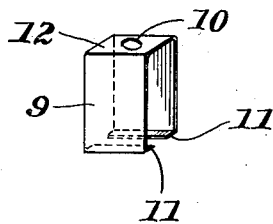

The invention is illustrated in one form by the accompanying drawing in which Fig. 1 is a vertical axial section of a heater made in accordance with the invention. Fig. 2 is a perspective view of a spacer shown in section in Fig. 1, as seen from a different viewpoint.

In the drawing, 1 is a portion of the top wall of a can containing the liquid into which the heater is to be immersed, not shown in the drawing. 2 is a seamless metal tube forming the wall of the immersion heater and is soldered or tinned around the joint 3 to the lid 1. 4 is a heat insulating liner. 5 is the main portion of a heating charge pressed into the insulated metal tube 2 and consists of a mixture of ingredients adapted to yield a molten slag but little or no gas when it is ignited. The priming composition portion 6 of the charge is pressed onto the top of the portion 5 and is made of a more easily ignited composition which also yields little or no gas but leaves a hot molten slag assisting the ignition of the portion 5. 7 is a fuze terminating in a match head 8 establishing an ignition contact with the heating charge. 9 is a thin scrap metal spacer. As shown in Fig. 2 the spacer 9 has a filter supporting face 12 provided with an aperture 10 assisting the free effluxion of any gases from the materials below its level, and stands on inturned feet 11. 13 is a plug made by pressing loose fibrous incombustible heat-resisting materials such as asbestos fibre or glass wool on to the supporting face 12 of the spacer 9 standing on the charge portion 5, the materials being pressed around the fuze 7. 14 is a disc having an aperture through which the upper end of the fuze 7 protrudes. 15 is a tightly fitting, but removable, closure cap.

While there has been described only a single embodiment of the invention, it will be obvious to those skilled in the art that various changes and modifications may be made therein without departing from the invention and it is, therefore, to be understood that the invention is not restricted to the details of the present disclosure otherwise than as defined in the appended claims.

I claim:

1. A chemical immersion heater comprising a container having venting means at its upper end communicating with the exterior thereof, a charge compacted in the lower end of said container including a heating composition comprising at least in part a packed mixture of solid ingredients adapted on ignition to react exothermically to yield a molten slag as the principal product of their reaction, a spacer body adapted to permit gas to flow past it, supported by and in direct contact with the said heating composition, and a gas permeable cooling filter interposed between the said spacer body and the said venting means, and comprising a mass of loose incombustible material pressed into the form of a plug, completely filling the upper end of the container immediately below the venting means and supported by the said spacer body.

2. A chemical immersion heater comprising a substantially cylindrical container having a closed lower end, a vented closure at its open end, a charge of a heating composition comprising a mixture of solid ingredients adapted on ignition to react exothermically and to yield a molten slag as the principal product of reaction packed in the lower end of the container, a spacer element supported upon said composition and extending upwardly a substantial distance thereabove, and a gas permeable cooling filter supported upon the upper end of the element, coextensive in cross-sectional area with the container and confined by the vented closure, said filter comprising a mass of loose, incombustible material pressed into the form of a plug and preventing the escape of slag and sparks through said vented closure.

3. A chemical immersion heater comprising a substantially cylindrical container having a closed lower end, a vented closure at its open end, a charge of heating composition packed in the lower end of the container, and comprising a mixture of solid ingredients adapted on ignition to react exothermically and to yield a molten slag as the principal product of reaction, a gas permeable cooling filter comprising a mass of loose, incombustible material pressed into the form of a plug, coextensive in cross-sectional area with the container disposed immediately below said vented closure, and preventing the escape of slag and sparks through said vented closure, and means for supporting said filter in said position and in spaced relation to and above said charge of heating composition, thereby providing a free expansion space between the charge and the filter.

4. A heater in accordance with claim 3 characterized in that the plug is made of fibrous material unaffected by the gaseous products of combustion.

5. A heater in accordance with claim 3 characterized in that the free expansion space has a volume at least equivalent to the increase in volume of the heating composition on ignition thereof.

WALTER ANDERSON CALDWELL.